Nov. 17, 1953  G. A. LYON  2,659,460
BRAKE DRUM AIR COOLING DEVICE
Filed Aug. 13, 1949  2 Sheets-Sheet 1
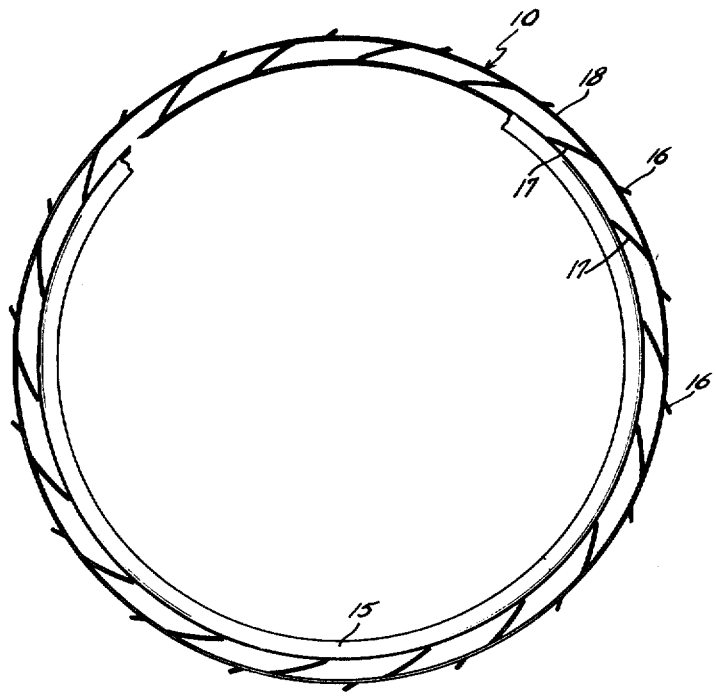
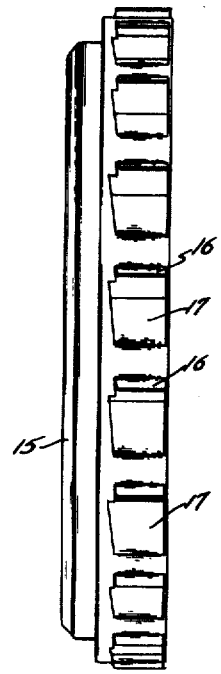
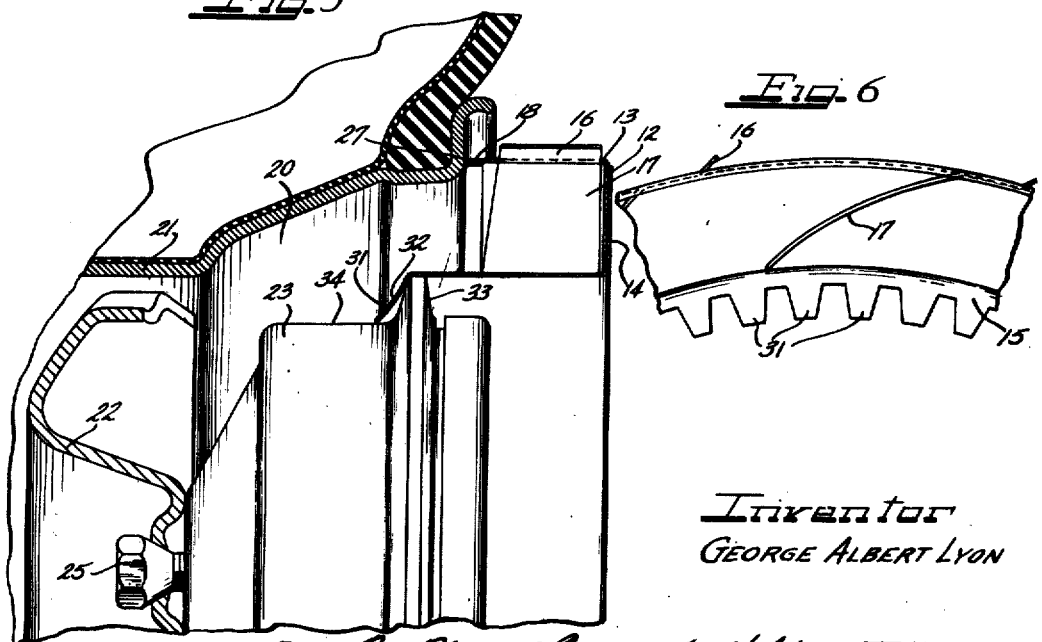
Inventor
GEORGE ALBERT LYON

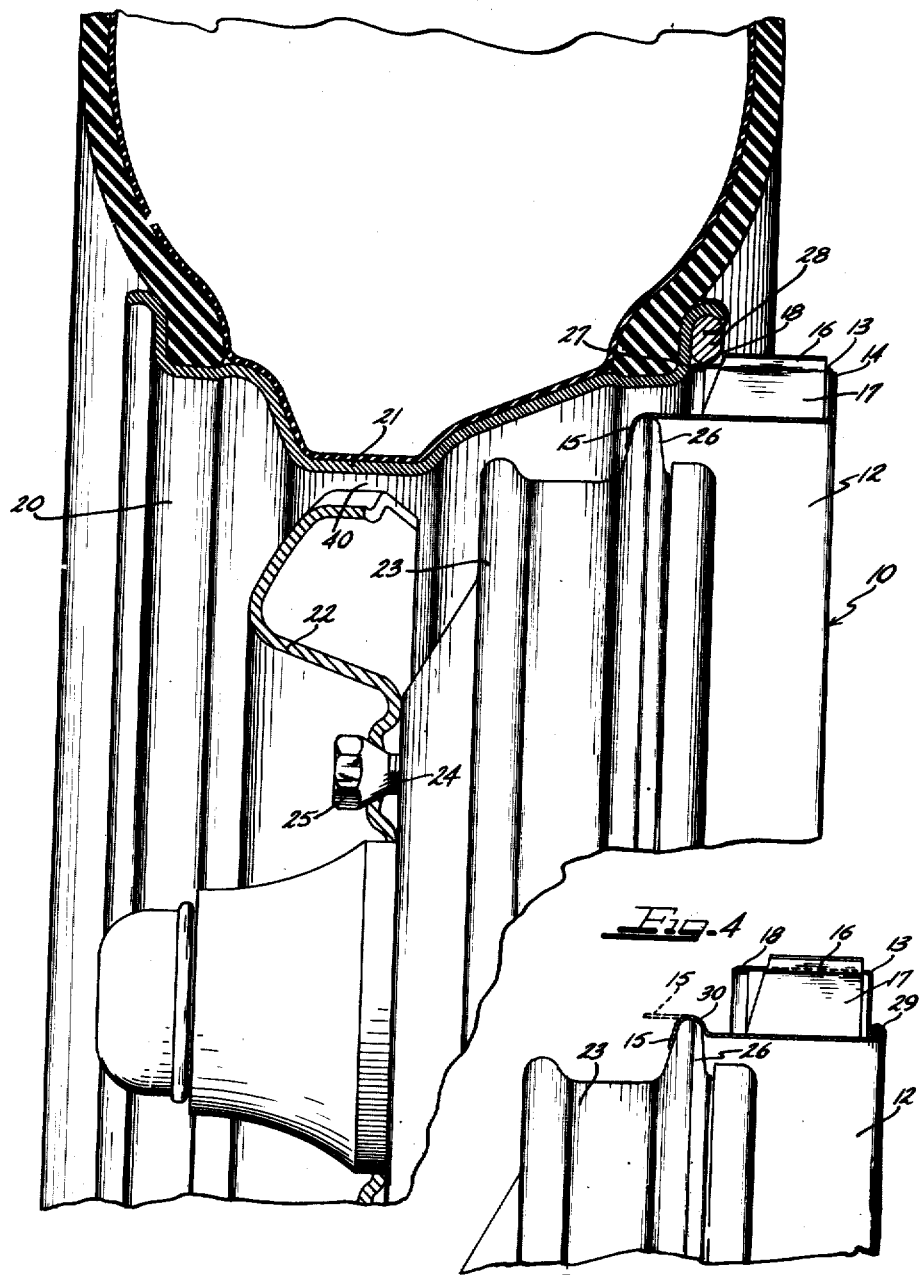

Patented Nov. 17, 1953

2,659,460

UNITED STATES PATENT OFFICE 2,659,460

BRAKE DRUM AIR COOLING DEVICE

George Albert Lyon, Detroit, Mich.

Application August 13, 1949, Serial No. 110,093

13 Claims. (Cl. 188—264)

The present invention relates to improvements in the cooling of brake drums in vehicle wheel assemblies, and more particularly concerns an expedient promoting the circulation of air around and over the surfaces of a brake housing or drum for cooling the housing of heat resulting during operation of the brakes in running of the associated vehicle.

During operation of a vehicle brake a large amount of frictional energy is created between the brake shoes and the brake drum which must be dissipated as heat. Overheating and damage may result, especially in constructions where the brake drum is entirely encompassed by the tire rim and tire assembly, and the air about the brake drum tends to stagnate during running of the vehicle instead of circulating for cooling the drum.

An important object of the present invention is to provide an improved brake drum cooling expedient for avoiding the stagnation of air about the brake drum and for promoting a vigorous, efficient cooling air circulation over and about the brake drum.

Another object of the present invention is to provide a brake drum cooling device which may be easily inserted into a conventional wheel structure and firmly held therein by engagement with the brake housing to permit removal of the tire rim without the necessity of removing the cooling device.

Another object of the present invention is to provide a brake drum cooling device which may be manufactured from readily available inexpensive parts.

Other objects, features and advantages of the present invention will be apparent to those skilled in the art from the following description of certain preferred embodiments of the invention as shown in the accompanying drawings in which:

Figure 1 is an inner side elevational view of one form of brake drum cooling device within the scope of the present invention, with parts broken away to show the interior construction of the same;

Figure 2 is a peripheral elevational view of the cooling device shown in Figure 1;

Figure 3 is a fragmentary radial sectional view of the cooling device shown in Figures 1 and 2 installed within a wheel structure;

Figure 4 is a radial sectional view showing a modification of the device of the present invention with respect to the means for securing the components of the cooling device assembly together as well as the means for securing the entire assembly to the brake housing;

Figure 5 is a fragmentary radial sectional view of another modification of the present invention, differing from the device shown in Figures 1-3 by the means for securing the same to the brake housing; and Figure 6 is a fragmentary inner side elevational view of the cooling device shown in Figure 5.

As shown on the drawings:

A brake drum cooling device 10 embodying features of the present invention is preferably in the form of a sheet metal ring which for convenience in manufacture is constructed of a pair of annular shells comprising a radially inner annular shell 12 of generally L-shaped cross-section and a radially outer annular shell 13 of generally L-shaped cross-section, the shells having axially extending portions in predetermined spaced relation and radially extending flange portions in shell-securing abutment. To this end, the inner shell 12 has a radial flange portion 14 secured as by spot welding or the like to the corresponding radial flange portion of the radially outer shell 13. Thereby, the two shells define a generally U-shape ring the channel of which opens axially. The margin of the inner shell 12 opposite the flange 14 is formed with a generally radially inwardly extending flange portion 15 which is adapted to engage against an annular shoulder on a brake housing or drum.

Means are provided on the ring 10 for drawing air thereinto and for driving the air therefrom in the rotation of the ring. To this end, a series of louvres or vanes 16 are provided on the periphery of the ring 10 for scooping air into the hollow interior of the ring through the periphery thereof, and internal vanes 17 are provided for diverting the indrawn air to pass axially out of the open side of the ring device which thus functions in the nature of an impeller. In economical and convenient form, both the vanes 16 and 17 are struck out from the axial body portion of the outer ring shell 13, the vanes 16 extending angularly in the same direction from the periphery of the shell and the vanes 17 extending angularly inwardly and engaging at their tips against the axially extending body flange of the inner ring shell 12. As best seen in Figure 1, the arrangement is such that in effect one of the outwardly projecting vanes 16 in each instance through the medium of the intervening portion of the ring shell 13 affords substantially a continuation of one of the inwardly extending vanes 17. The several cooperating pairs of vanes 16, 17 are equally spaced about the cooler ring and cooperate with the walls of the ring shells to define air scooping and deflecting pockets having mouths comprising the apertures from which the vanes were struck in the peripheral shell 13 and open toward the open side of the drum cooler ring.

The free edge of the outer ring shell 13 is reinforced by means such as a return bent flange 18.

As best seen in Figure 3 the drum cooling device 10 is adapted to be assembled with a vehicle wheel for cooling purposes. Such a wheel may include a multiflange, drop center tire rim 20 which is secured as by riveting or welding of a base flange 21 thereof to a load sustaining central body portion or spider 22. At appropriate intervals air circulation openings 40 are provided between the wheel spider and the tire rim base flange 21.

The wheel in use is secured to a brake housing or drum 23 as by means of bolts 24 and attachment nuts 25. In this association, the inner portion of the tire rim encompasses the brake drum 23 in spaced relation and defines therewith an air circulation space or chamber which except for the air circulation openings 40 is closed at the outer side of the wheel by the wheel body 22. For cooling the brake drum 23 reliance is had upon circulation of air thereby through the air chamber and the air circulation openings 40. However, due to the fact that the brake drum 23 is entirely encompassed by the tire rim and a pneumatic tire carried by the rim and spreading axially beyond the side of the tire rim, movement of air past the wheel during operation of the vehicle tends to by-pass the brake drum 23 and as a result the air in the chamber about the brake drum tends to stagnate or even vacuumize as it is heated and thus there is danger of the brake drum overheating.

According to the present invention the brake drum is positively cooled by forcing a circulation of air from the inner side of the wheel generally axially outwardly through the chamber between the brake drum and the tire rim and about the brake drum and out through the ventilation openings 40 in the wheel to the front or outer side of the wheel. Such cooling circulation of air is diverted from the air which normally rushes past the brake drum and entirely by-passes the brake drum and actually tends to cause a vacuum about the brake drum. To this end, the air circulation promoting, brake drum cooling device 10 is mounted at the inner side of the wheel in substantially closing or covering relation to the inner side of the chamber defined between the tire rim and the brake drum and with the air scooping vanes 16 disposed angularly in generally the direction of rotation of the wheel so as to scoop air into and through the cooling ring 10 and so that the vanes 17 will impel the air into the brake drum cooling chamber for circulation therethrough and exhaust through the ventilation openings 40 in the wheel.

In mounting the air cooler ring 11, the radially extending marginal flange 15 of the inner ring shell 12 is assembled against a radially outwardly extending annular rib or shoulder 26 on the brake drum 23 prior to attachment of the wheel proper, and then the wheel proper is secured to the brake drum and acts to retain the cooler ring in place, this being effected by engagement of the flanged margin 18 of the outer ring shell 13 edgewise by the inner terminal flange of the tire rim as at 27 (Figure 3) with a firm thrust engagement which places the flange 15 under tension against the retaining shoulder rib 26. This places the open side of the ring 11 to open into the air circulation space about the brake drum 23. In order to accommodate the dimensional prerequisites of the wheel assembly, it will be observed that the axial flange portion of the inner shell ring 12 is somewhat wider than the corresponding flange of the outer ring shell 13. Moreover, the spacing between the axially extending flange portions of the ring shells is such as to accommodate the spacing between the tire rim and the brake drum. Ample space may be provided between the outer ring 13 and the lip of the tire rim terminal flange to accommodate one or more wheel balancing weights 28.

In the modification of Figure 4, a slightly different union of the inner and outer ring shells is effected, namely, by substantially lock-seaming adjoining margins of the inner sides of the shells as shown at 29 to provide a rolled joint. Moreover, in order to attach the shell ring to the brake drum 23 in a manner to avoid disassembly when the wheel proper is removed, a crimp or groove 30 generally complementary to the annular shoulder rib 26 of the brake drum is provided for retaining the cooler ring assembly in place. In the initial assembly of the ring upon the brake drum, the retainer flange or lip 15 is cylindrical as shown in dash outline, so that the ring assembly can be assembled with the brake drum from the rear until the crimp groove 30 seats on the brake drum rib 26, and then the flange or lip 15 is bent or spun down into clamping engagment against the brake drum rib.

In the modification of the cooling device as shown in Figures 5 and 6, the construction of the air circulation promoting shell ring is substantially the same as in the disclosure of Figures 1 to 3, inclusive, but somewhat different means are provided for securing the device to the brake drum. To this end, the outer or free margin of the inner shell 12 has the retaining flange or lip 15 formed with a series of retaining teeth 31 which extend generally radially inwardly and axially outwardly to an inner diameter which is somewhat less than the diameter of a surface 34 on the brake drum axially outwardly of a shoulder rib 33 on the brake drum. The diameter of the axially extending body flange portion of the inner ring 12 is sufficient to clear the rib 33. In assembling this form of the device with the brake drum, the device is applied prior to attachment of the wheel proper to the brake drum by moving the device axially inwardly about and onto the brake drum until the retaining fingers 31 retainingly engage the surface 34 and are forced to the fully assembled relation against the outer side of the retaining rib 33. To enhance the retaining qualities of the retaining fingers 31, they are slightly concavely bowed as indicated at 32. Any tendency toward displacement axially outwardly of the cooler ring is effectively resisted by the retaining fingers 31 since that will only cause them to bite more effectively into the drum surface 34.

In all forms of the brake drum cooling device, it will be apparent that the device projects sufficiently inwardly beyond the terminal flange of the rim and the maximum inward bulge of the tire side wall to intercept the air stream that flows past the wheel during forward travel of the vehicle so that as the cooler ring rotates with the wheel the vanes 16 will scoop air from the air stream into the ring and then the vanes 17 will impel the air to pass outwardly from the cooler ring and into the drum cooling chamber and thence exhaust in heated condition through the wheel openings 40. In this way the brake drum is efficiently cooled.

Certain features disclosed but not claimed in the present application are covered in my copending application Serial No. 104,348, filed July 12, 1949.

It will be understood that various modifications and variations may be effected without departing from the novel concepts of the present invention.

I claim as my invention:

1. In a wheel assembly including a wheel comprising a tire rim and a wheel body having air circulation openings therethrough and attached to a brake drum substantially encompassed in spaced concentric relation by the tire rim, an air cooling structure mounted in substantially closing relation to the inner opening between the brake drum and the tire rim, said air circulation structure having a radially outwardly facing annular portion extending axially inwardly beyond the tire rim and having air motivating means thereon comprising a series of air moving elements angled in the direction of movement of the wheel for diverting air from the stream passing the inner side of the wheel during travel into and through the space between the tire rim and the brake drum and in cooling relation about the brake drum and then out through the wheel openings.

2. In combination with a brake drum and a wheel mounted on the brake drum including a wheel body and a tire rim, with the tire rim substantially encompassing the brake drum in concentric spaced relation, an air cooling ring device located at the inner side of the wheel comprising an annular hollow shell of substantially U-shape cross-section opening toward the space between the brake drum and the tire rim and closing the mouth of such space, said ring having means projecting inwardly beyond the innermost portions of the tire rim and any tire mounted therein for diverting air into the ring and thence into the space between the tire rim and the brake drum, said ring having a radially inner wall secured to the brake drum and a radially outer wall engaging the inner side of the tire rim, said radially outer wall having openings therein and said air deflecting means being associated with said openings.

3. In a brake drum cooling device, a hollow ring having radially spaced axially extending walls and a connecting radial wall and being open on the opposite side from said radial wall, the radially outer axially extending wall having a series of openings therein, and air deflection means at said openings directed angularly for diverting air into said openings in the rotation of the ring and including means for compelling movement of the air from the interior of the ring out of said opposite open side.

4. In a brake drum cooling device, a hollow ring structure open at one side and having a series of openings in another portion thereof including outwardly projecting portions for diverting air through said openings into the ring in the rotation of the ring, said ring having a flange thereon engageable retainingly with a portion of a wheel assembly, said flange comprising a crimped channel rib engageable with an annular rib on a brake drum.

5. In combination in a brake drum cooling device, a pair of annular L-shaped shell members, said shell members having respective angular legs thereof secured together to form with the remaining legs of the members a hollow ring, one of said shell members having openings therein and air deflecting integral portions at said openings for deflecting air into the ring in the rotation of the ring.

6. A composite ring structure comprising an inner annulus having peripheral attaching means and an outer annulus connected to said inner annulus and having integrally formed deflecting vanes arranged to project alternately outwardly and inwardly from said outer annulus, said outer annulus having air openings between the vanes for movement through the ring structure of air under the influence of said vanes, the inwardly directed vanes extending into contact with said inner annulus.

7. In combination in a brake drum cooling ring structure, a pair of sheet metal rings of substantially L-shape cross-section with generally axially extending portions in spaced concentric relation and radially extending portions secured together and defining a closure for one side of the assembly while the remaining side is open, the outer of said shells having a series of openings therein defined by outwardly projecting vanes for diverting air into the ring assembly.

8. As an article of manufacture, a sheet metal hollow annulus adapted to be mounted at the inner side of a vehicle wheel at the annular opening between a tire rim and a brake drum of the wheel, said annulus having spaced radially inner and outer annular walls defining an annular opening from one axially directed side of the annulus, the radially outer annular wall facing radially outwardly and including a plurality of spaced openings therethrough to the interior of the annulus, and air deflector means at said openings for effecting movement of air through said openings and the annulus upon rotation of the annulus.

9. As an article of manufacture, a brake drum cooling ring structure comprising a hollow annular body of generally channel shape cross section and opening toward one axial side of the body, means on the radially outer periphery of the body for deflecting air into the interior of the body upon rotation of the ring in one direction, and means inside said body for deflecting the air in axial direction toward said axial opening.

10. In a wheel assembly including a wheel comprising a tire rim and a wheel body having means thereon attaching the same to a brake drum substantially encompassed in spaced concentric relation by the tire rim, an air circulation promoting annulus mounted at the inner side of the wheel at the space between the tire rim and the brake drum, said annulus comprising a pair of originally separate but cooperatively connected annular members of differential diameter to afford a space therebetween and having cooperatively related and mutually retainingly interconnected flanges at their axially inner margins while the axially outer margins of the annular members define a mouth opening into the space between the tire rim and the brake drum, the outer margin of the larger diameter of said annular members retainingly cooperating with the tire rim and the outer margin of the radially inner of said annular members cooperating retainingly with the brake drum, one of said cooperatively related flanges engaging at the axially outer side of the other of said cooperatively related flanges whereby in cooperation with the marginal engagement of the members respectively with the tire rim and the brake drum the members are positively held not only against separation from one another but also against separation from the tire rim and the brake drum, and means on one of said members for promoting circulation of air through the annulus and said space between the brake drum and the tire rim.

11. As an article of manufacture, a brake drum air cooling device comprising radially inner and radially outer respective annular members of differential diameter to afford a space therebetween, the radially outer of said members having means at one margin for retaining cooperation with a tire rim and the radially inner of said members having means at the corresponding margin for retaining cooperation with a brake drum of a wheel on which the device may be mounted, the opposite margins of said members having cooperatively related and interengaged retaining flanges one of which is disposed inside of the other so that in association of the device with a wheel the flanges cooperate to retain the members against axially separation from the wheel, and means on one of said members for promoting circulation of air through the annulus.

12. As an article of manufacture, a brake drum air cooling device comprising an annular structure including radially inner and radially outer annular walls of differential diameter to afford a space therebetween and defining an annular opening from one axially directed side of the device, the radially outer of said walls having a series of openings therein each of which has at one edge an air scoop vane and at the opposite edge a vane directed inwardly into the device toward the radially inner of said walls and operative to compel movement of air scooped into the device by the air scoop vanes outwardly through said axially directed annular opening.

13. In a brake drum cooling ring structure, an annular generally channel-shaped hollow shell open at one side and having a radially outer periphery provided with a series of vane structures comprising respective diagonally generally radially outwardly directed portions and respective generally radially inwardly directed portions, and said radially outer periphery of the shell having openings through which air is deflected into the shell by said generally radially outwardly directed vane portions during rotation of the shell in service, the air then being deflected toward the open side of the shell by the generally radially inwardly directed vane portions.

GEORGE ALBERT LYON.

References Cited in the file of this patent

UNITED STATES PATENTS

| Number | Name | Date |
|---|---|---|
| 2,143,950 | Kliesrath | Jan. 17, 1939 |
| 2,265,938 | Eksergian | Dec. 9, 1941 |
| 2,312,159 | Gulotta | Feb. 23, 1943 |
| 2,331,259 | Whitten | Oct. 5, 1943 |
| 2,489,522 | Chase | Nov. 29, 1949 |

FOREIGN PATENTS

| Number | Country | Date |
|---|---|---|
| 572,202 | Great Britain | Sept. 27, 1945 |
| 787,597 | France | Sept. 25, 1935 |
| 481,521 | Germany | June 3, 1925 |